Figure 1:
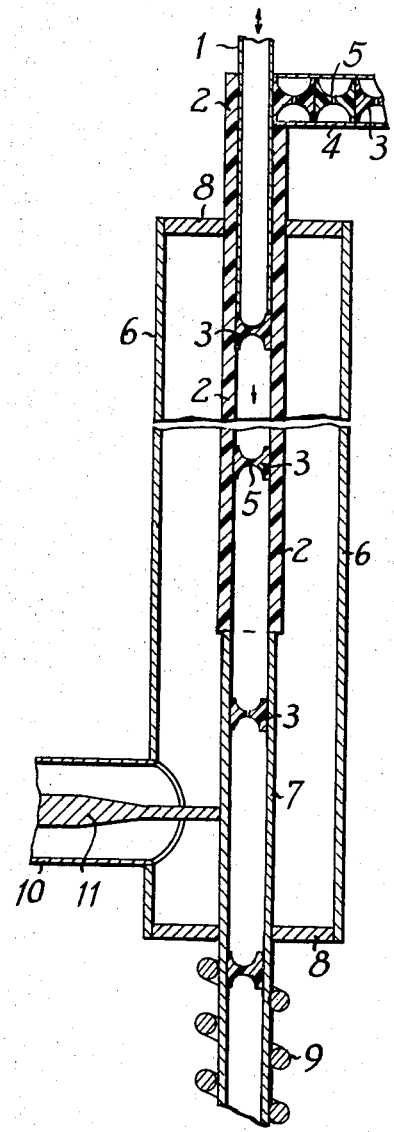

United States Patent

[11] 3,537,385

| [72] | Inventors | Herbert August Puschner<br>175 Osterholzer Heerstrasse;<br>Horst Eberl, Hornestrasse 18, Bremen,<br>Germany |
|------|-----------|---|
| [21] | Appl. No. | 654,909 |
| [22] | Filed     | July 20, 1967 |
| [45] | Patented  | Nov. 3, 1970 |

[54] DEVICE FOR THE PRODUCTION OF SKINLESS SAUSAGES
6 Claims, 2 Drawing Figs.

| [52] | U.S. Cl. | 99/353, 219/10.55 |
|------|----------|---|
| [51] | Int. Cl. | A22c 11/00 |
| [50] | Field of Search | 99/109, 353—349, 441, 327, 340, 358, 403; 17/32, 33, 45; 219/10.55 |

[56] References Cited
UNITED STATES PATENTS

| 3,132,950 | 5/1964 | Macy et al. | 99/109 |
| 2,495,415 | 1/1950 | Marshall | 99/358X |
| 3,307,010 | 2/1967 | Puschner | 219/10.55 |
| 3,457,385 | 7/1969 | Cumming | 219/10.55 |

FOREIGN PATENTS

| 891,175 | 3/1962 | Great Britain | 99/109 |

Primary Examiner—Walter A. Scheel
Assistant Examiner—Arthur O. Henderson
Attorney—Wolf, Greenfield and Sacks ABSTRACT: A hollow waveguide concentrically surrounds a nonconducting sausage guide and is connected to a microwave generator by a coaxial waveguide contiguous with the nonconducting sausage guide.

DEVICE FOR THE PRODUCTION OF SKINLESS SAUSAGES

The present invention is concerned with a device for the production of skinless sausages.

The meat-preparing industry produces skinless sausages which are marketed in tins or foil packages. In the case of the manufacturing processes at present used, these sausages are cooked and smoked in synthetic resin skins (Naturin). Subsequently, the skin is again peeled off. This laborious and expensive working step is necessary since the sausage mass must be brought into the necessary shape with the help of the skin.

After cooking, a skin has formed around the sausage from coagulated protein which imparts to the sausage sufficient form stability. The production of these skinless sausages was taken up because the peelable skin is cheaper than the skin normally used.

The problem with which the present invention is concerned is to provide a device for the production of skinless sausages in which the use of the peelable skin for the forming thereof is not necessary.

According to the present invention, this is achieved in that the sausage mass is subjected, in a nonmetallic mould, to the action of an electrical radiation field, preferably in the microwave frequency.

By the influence of the radiation field, there can be produced a sufficiently firm skin in the shortest possible time which can be used in conjunction with production in a continuous process so that it is not necessary to use a temporary moulding by means of a special peelable skin.

For carrying out the process according to the present invention, there is used a nonmetallic mould of energy-permeable synthetic resin, preferably of Teflon (Teflon is a Registered Trade Mark) which is connected to a press for the sausage mass and is arranged in the radiation chamber of an electrical wave generator. This mould can be arranged in a tubular conductor to which is expediently connected a coaxial conductor for coupling in. There is thus provided a simple arrangement which is suitable for production in a continuous process. By the treatment in the radiation field there can also be produced, at the same time, the red coloration of the sausage which is frequently desired.

Figure 2:
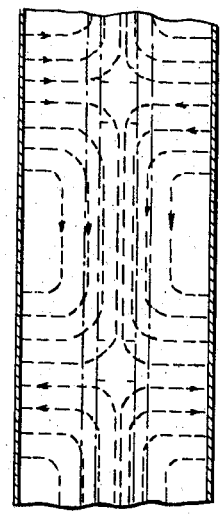

For a better understanding of the present invention, one embodiment thereof will now be described in more detail, with reference to the accompanying drawings, in which:

FIG. 1 shows an axial and schematic cross section of a device for carrying out the process according to the present invention; and FIG. 2 shows a section of the treatment zone with an indication of the field lines.

By means of an injection nozzle 1, which moves in and out, of a sausage filling machine, sausage meat is injected into a tube 2 made of nonmetallic or nonconducting material such as Teflon and is forced through the tube 2 counter to the direction of propagation of an electromagnetic wave in order to achieve a slow warming up of the sausage meat. For the production of the individual sausages, distance pieces made from Teflon are introduced regularly into the tube 2 at time intervals corresponding to the rhythm of the nozzle 1, these distance pieces 3 being supplied by a magazine 4. The injection nozzle 1 pushes forward the distance piece by an amount equal to the length of a sausage. Upon withdrawal of the injection nozzle, a further amount of sausage mass is injected. This procedure is repeated with a rapid rhythm. However, care is to be taken that no air inclusions remain behind. This can be achieved by the provision of central borings 5 in the distance pieces, these borings 5 being so dimensioned that air can readily escape but the sausage meat can only escape with difficulty.

The formed sausage first passes through the Teflon tube 2, which lies centrally in a tubular conductor 6 and is then pushed through the tubular-shaped inner conductor 7 of a coaxial system, this coaxial system consisting of an extension of the tubular conductor 6 and the inner conductor 7. The inner conductor tube 7 passes through the end wall 8 of the coaxial conductor 6, 7. An external extension of the tube 7 is surrounded by a cooling worm 9. Cooling is necessary because hot sausages would burst upon emerging from the exit.

The finished sausages can subsequently be smoked in a bath with smoking essences. If the use of essences is not possible, then the smoking can be carried out in the previously used manner, possibly with the use of suspended or shaking grates.

The microwave energy is galvanically coupled into the coaxial conductor 6, 7 of large cross section from a coaxial conductor 10, 11, which conductor 6, 7 passes over into the tubular conductor 6 with the concentric Teflon tube 2.

The coaxial and tubular conductors are thereby so dimensioned that no resistance jump occurs. Any reflexions present are prevented by compensation means. The long waves spreading out in the coaxial conductor thereby pass over into a tubular conductor wave of type $E_{o1}$, the electrical field lines of which permeate the sausage meat.

We claim:

1. Microwave heating apparatus for producing skinless sausages comprising:
   nonconducting sausage guide means for receiving sausage meat;
   conducting hollow waveguide means concentrically surrounding said sausage guide means to define a heating chamber;
   a source of microwave energy; and
   means including a coaxial waveguide with its end connected to said hollow waveguide and coaxial about the axis of said hollow waveguide and said sausage guide means for coupling said microwave energy source to said hollow waveguide.

2. Microwave heating apparatus in accordance with claim 1 and further comprising:
   inlet means contiguous with said sausage guide means and separated by the latter from said coaxial waveguide; and
   a source of end pieces for forming the ends of the sausages connected between said inlet means and said hollow waveguide means.

3. Microwave heating apparatus in accordance with claim 1 wherein the inner conductor of said coaxial waveguide is contiguous with said nonconducting sausage guide means.

4. Microwave heating apparatus in accordance with claim 3 wherein said end pieces are formed with fine holes for passing air and blocking sausage meat.

5. Microwave heating apparatus in accordance with claim 3 and further comprising:
   inlet means contiguous with said sausage guide means and separated by the latter from said inner conductor; and
   a source of end pieces for forming the ends of the sausages connected between said inlet means and said hollow waveguide means.

6. Microwave heating apparatus in accordance with claim 5 wherein said end pieces are formed with fine holes for passing air and blocking sausage meat.